(12) United States Patent
Patrito

(10) Patent No.: US 6,478,530 B2
(45) Date of Patent: Nov. 12, 2002

(54) ROCKING STATION FOR TREATMENT PLANT CONVEYANCE SYSTEMS

(75) Inventor: Donato Patrito, Leini (IT)

(73) Assignee: Fata Automation S.p.A., Pianezza (IT)

( * ) Notice: Subject to any disclaimer, the term of this patent is extended or adjusted under 35 U.S.C. 154(b) by 0 days.

(21) Appl. No.: 09/770,464

(22) Filed: Jan. 29, 2001

(65) Prior Publication Data

US 2001/0010795 A1 Aug. 2, 2001

(30) Foreign Application Priority Data

Jan. 28, 2000 (IT) .................................. MI000048 U

(51) Int. Cl.[7] .............................. B66D 1/00; B66D 1/36
(52) U.S. Cl. ...................................................... 414/678
(58) Field of Search .......................... 414/678; 254/338, 254/362, 393, 394; 187/213, 252, 254, 264–266

(56) References Cited

U.S. PATENT DOCUMENTS

| | | | | |
|---|---|---|---|---|
| 1,476,596 A | * | 12/1923 | Cullen ......................... | 187/213 |
| 1,697,364 A | * | 1/1929 | McCollum et al. ......... | 414/678 |
| 2,420,903 A | * | 5/1947 | Noble ......................... | 187/213 |
| 2,642,198 A | * | 6/1953 | German ....................... | 254/338 |
| 4,595,313 A | * | 6/1986 | Kotke .......................... | 414/678 |
| 4,861,192 A | * | 8/1989 | Porter ......................... | 254/394 |
| 5,076,753 A | * | 12/1991 | Ahlsen et al. ............... | 414/678 |
| 5,573,084 A | * | 11/1996 | Hakala ........................ | 187/252 |
| 6,241,048 B1 | * | 6/2001 | Heilmann .................... | 187/263 |

* cited by examiner

Primary Examiner—Kathy Matecki
Assistant Examiner—Sang Kim
(74) Attorney, Agent, or Firm—Jacobson Holman PLLC

(57) ABSTRACT

A rocking station includes a frame in which there is a powered rocking board onto which are fed objects to be rocked. The board is supported on the floor supports arranged near its two opposite ends with the supports defining two parallel rotation axes of the board with each one near one of the opposite ends and transversal to the board. On each side of the board there is a chain defining two main lifting branches with each main branch being arranged between one part of the frame above the board and couplings to the board being arranged near one of the opposite ends of the board. A motor causes the chains to run on command in one or the other direction to alternately place one main branch or the other under tension and lift the corresponding board end by rotating the board around the rotation axis near the opposite end.

7 Claims, 2 Drawing Sheets

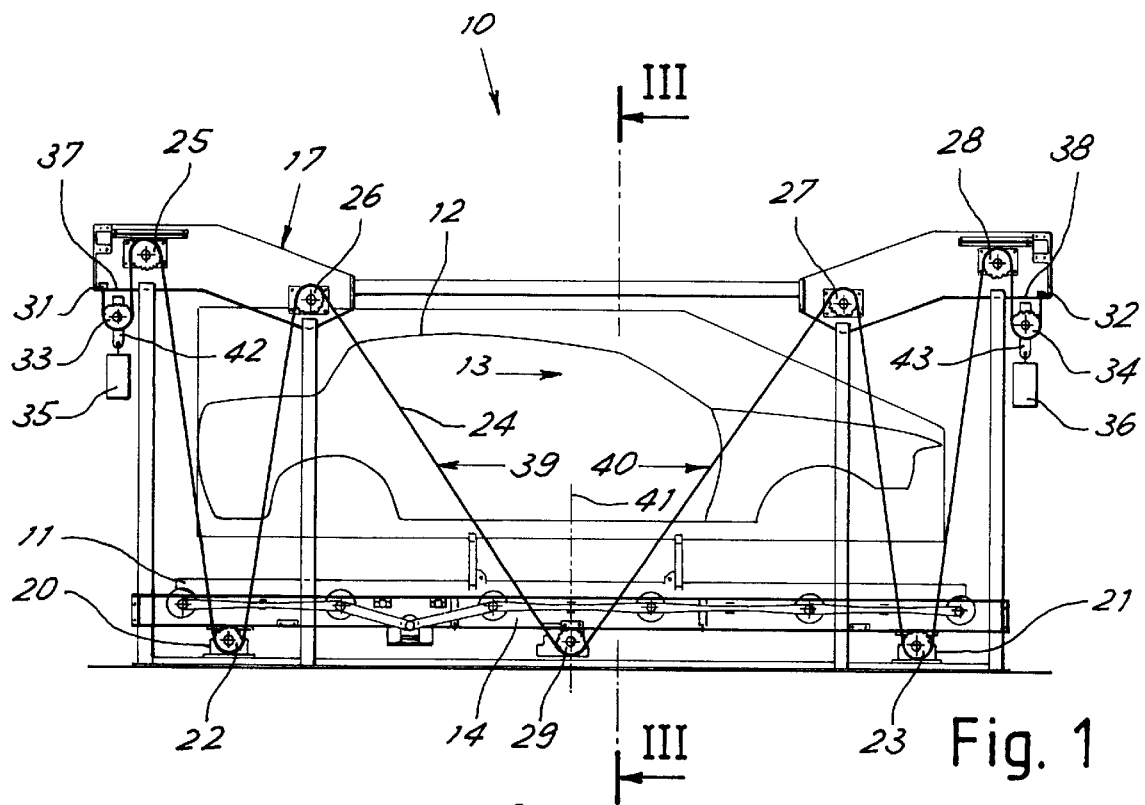
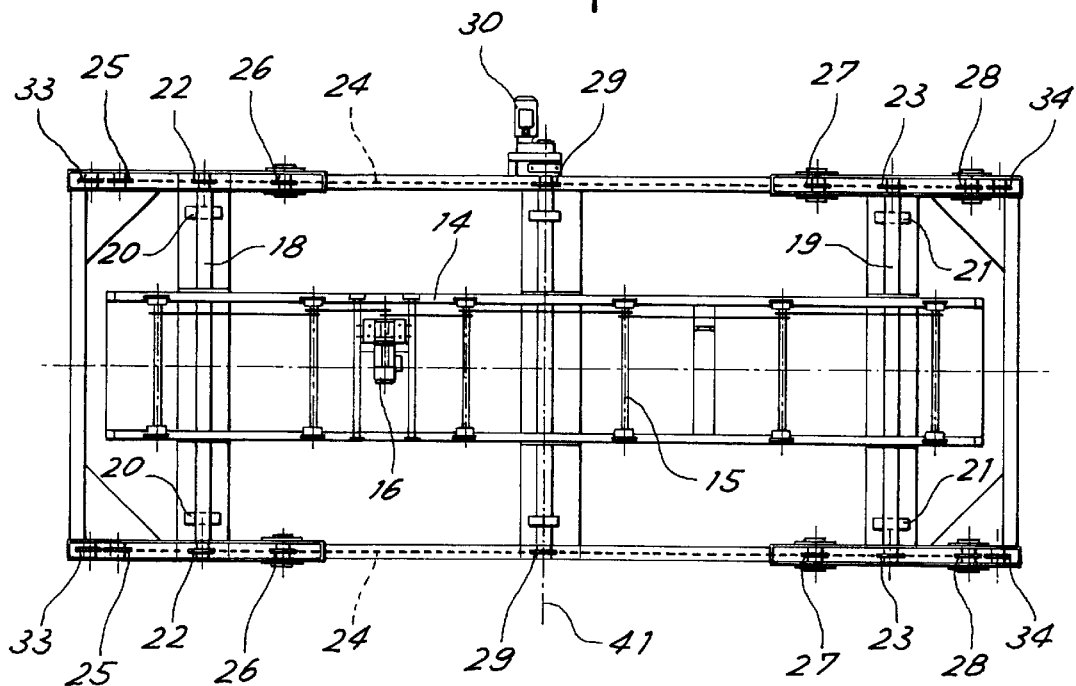

ROCKING STATION FOR TREATMENT PLANT CONVEYANCE SYSTEMS

BACKGROUND OF THE INVENTION

The present invention relates to a rocking station to be used in treatment plant conveyance systems, for example for sheet metal frameworks such as motor vehicle chassis.

In the prior art rocking stations used when it is necessary to swing objects being processed around one of the main axes to perform technological operations such as for example spraying fluids or scavenging liquids from pockets, shallow water et cetera are known.

For example in the engineering of treatment by means of fluids of the surfaces of frameworks made of sheet metal in certain steps it is necessary to change the distance and direction of fluid streams with respect to the surfaces being treated or after a typical dipping treatment in a vat or spraying it is necessary to scavenge the liquids remaining trapped in the framework by swinging it.

Usually the frameworks being processed advance while supported on a frame or base board termed 'skid' which can be provided with two sleds applied each to the framework or an actual frame in the shape of a sled on which is the framework constrained.

The rocking movement can be achieved in various ways. For example the board can be swung alternately around end axes transversal to the travel direction or the board can be swung around a central axis transversal to the travel direction.

To achieve alternate rocking around the end axes of the board various solutions, all relatively complicated, have been proposed in the prior art. For example stations powered to lift the center and two controlled bolts, one at each end, or release of one of the bolts allowing lifting of the corresponding board end have been proposed. Stations with two independent power sources, one for each board end or with a single power source equipped with an engagement and disengagement mechanism allowing alternate powering at the two ends have also been proposed.

All these solutions are relatively complicated and cumbersome and generally require relatively complicated management.

The general purpose of the present invention is to remedy the above mention ed shortcomings by making available a rocking station with simple and reliable structure, reduced space occupied and simple management.

SUMMARY OF THE INVENTION

In view of this purpose it was sought to provide in accordance with the present invention a rocking station comprising a frame in which there is a powered rocking board onto which are fed objects to be rocked characterized in that the board rests on the floor on supports arranged near its two opposite ends with the supports defining two parallel rotation axes of the board and each one near one of said opposite ends and transversal to the board with there being on each side of the board a chain defining two main lifting branches with each main branch arranged between one part of the frame above the board and couplings to the board arranged near one of said opposite ends of the board with a motor causing the chains to run on command in one or the other direction to alternately place under tension one or the other main branch and lift the corresponding board end by rotating the board around the rotation axis near the opposite end.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a diagrammatic side elevation view of a station in accordance with the present invention, FIG. 2 shows a plan view of the station of FIG. 1.

DETAILED DESCRIPTION OF THE INVENTION

Figure 3:
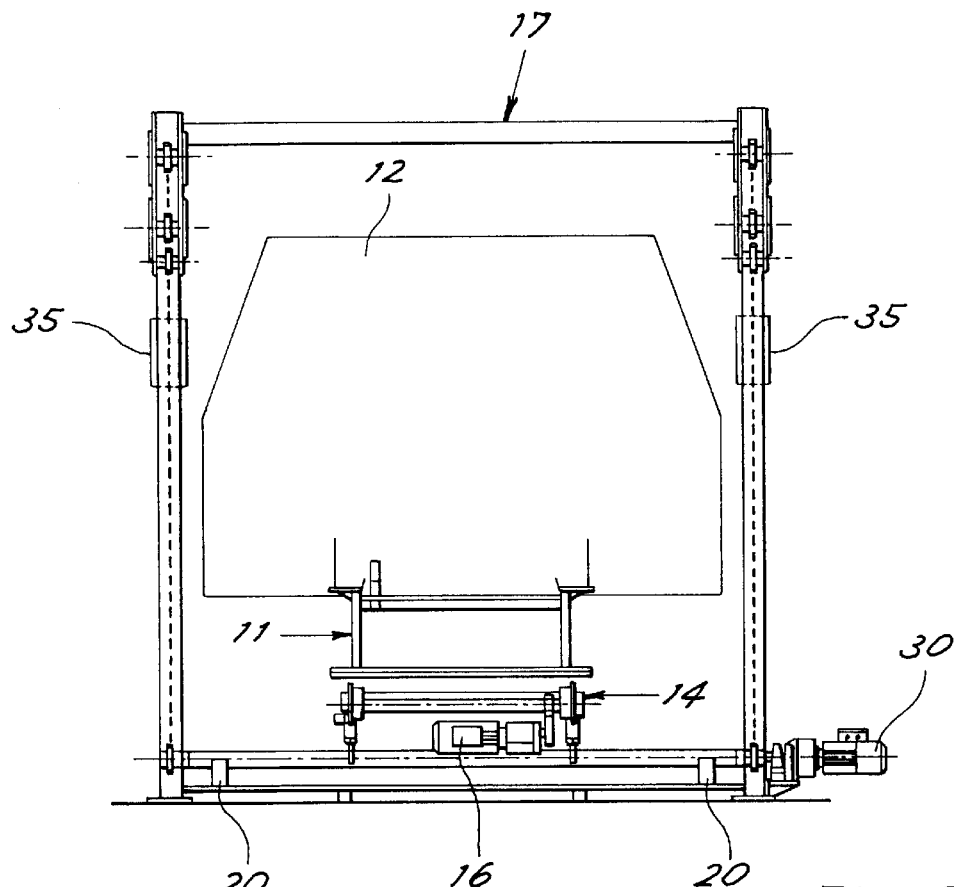
FIG. 3 shows a cross section view along plane of cut III—III of FIG. 1.

With reference to the figures, FIG. 1 shows a rocking station designated as a whole by reference number 10 to which tables 11 for support and transport of objects 12 are fed sequentially in the direction indicated by the arrow 13 by known conveyance system means not shown. The object 12, for example a motor vehicle framework, is constrained to the board by known means not further shown nor described because readily imaginable to those skilled in the art. The station comprises a trestle 17 in which is a rocking board 14 on which runs and rests the conveyance table 11 which enters the station. For moving the conveyance table in the station the rocking board is equipped with transversal rollers 15 powered synchronously by a motor 16. In this manner when a table 11 enters the station it is taken over by the station conveyance system made up of the powered rollers 15.

The station conveyance system is made in such a manner as to prevent accidental running of the board received in the station.

The board 14 has a pair of supports 18, 19 arranged symmetrically near the head and tail ends of the board to allow support of the board on appropriate saddle shaped supports 20, 21 fastened on the floor. The supports define rotation axes transversal to the board in such a manner that the board can tilt while rotating around one support or the other as clarified below.

Near the supports the board is equipped with idling pulleys 22, 23 for a pair of chains 24 arranged at the sides of the board 14. Advantageously the rotation axis of the pulleys coincides virtually with the rotation axes of the board on the respective supports. The pulleys 22, 23 make couplings of the chains to the rocking board to lift it as clarified below.

As may be seen again in FIG. 1 the two branches of the chain which wind partially around each pulley 22, 23 are directed upwards to reach a respective upper pulley 25, 26, 27, 28 each.

The branches which wind on the innermost pulleys 26, 27 descend to join in a central pulley 29 arranged beneath the table 11 and fastened to the floor. The pulley 28 is 10 powered by a motor 30.

The branches of the pulleys 22, 23 are directed towards the outermost pulleys 25, 28 and wind around them and are fastened to the upper frame of the station opposite an anchorage 31, 32. Between the pulleys 25, 28 and the connection 31, 32 the chains form a loop in which is hung a pulley 33, 34 to which is hung a counterweight 35, 36. The counterweight pulleys are near an appropriate upper striker 37, 38 on which they can be supported alternately by means of their brackets 42, 43 as clarified below.

Basically, each chain defines two main branches 39, 40 extending from the rocking board to the frame above them to lift one end or the other of the board depending on the direction of rotation of the motor. The two main branches of each chain are arranged symmetrically to a median plane 41 transversal to the board. The motor is advantageously located near this transversal plane.

Figure 4:
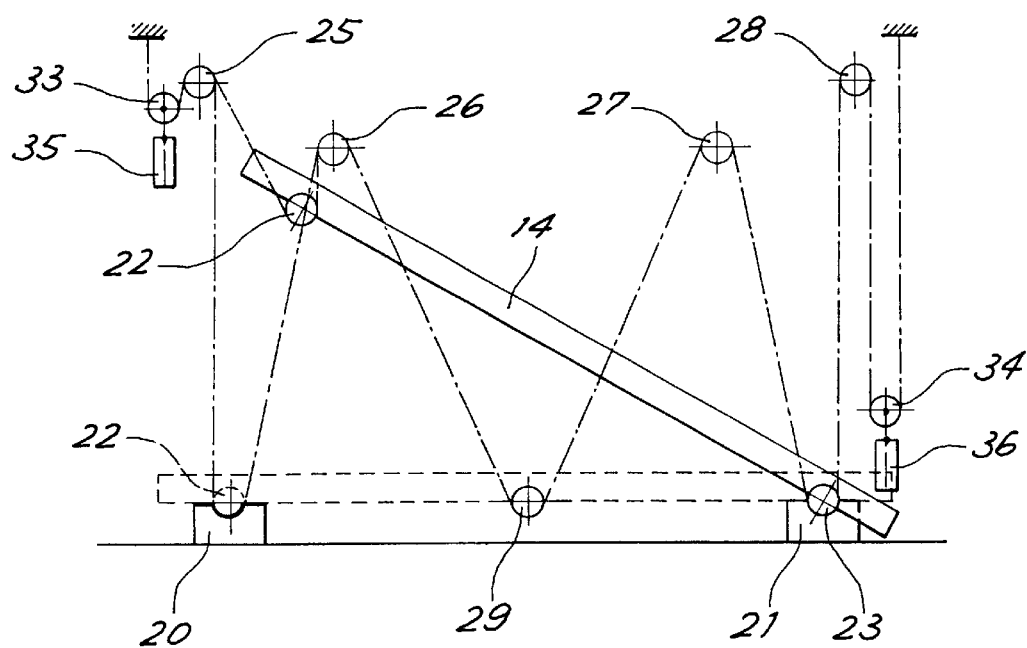
FIG. 4 shows a diagrammatic view of a rocking movement of the station.

By appropriately operating the motor 30 the chain is made to run to the right or left so that the main branch respectively to the left or right of the powered pulley 29 becomes shorter or longer while the opposite branch is held in tension by its counterweight. Thus, the table 11 is lifted at one end while it rotates on a pin around the opposite floor support. This is shown as an example in FIG. 4 for a counterclockwise rotation of the powered pulley. The pulley of the counterweight on the board part which rises goes to rest against the respective upper striker 37 or 38. A rotation in the opposite direction would of course cause specular movement of the board. A continuous alternating rocking movement can be readily achieved with a continuous timed reversal of the motor movement.

It is now clear that the predetermined purposes have been achieved by making available a station with very simple mechanics and small in size (in particular with minimal clearance between the board level and the floor) allowing rocking of a support table onto which are fed support boards.

In addition to the advantage of a single power source and the absence of other mechanisms such as for example the prior art bolts for the tilting movement on one side or the other, the station in accordance with the present invention also has the advantage of supplying partial load balancing because during the rise of one end the active counterweight (which descends) is the one on the opposite end and the counterweight on the rising end is located permanently at the top.

In addition, all the mechanical parts are arranged outside the rocking board viz outside the zone where the liquids can drip and excellent inspectability, accessibility and maintainability are achieved.

Naturally the above description of an embodiment applying the innovative principles of the present invention is given by way of non-limiting example of said principles within the scope of the exclusive right claimed here. For example the chain path can be different from that shown and the motor can be positioned opposite other idling pulleys. In particular, the powered pulley 29 can be arranged in the station ceiling by exchanging the positions of the pulleys 18, 19 and 26, 27.

What is claimed is:

1. Rocking station comprising
   a frame having a powered rocking board onto which are fed objects to be rocked, the rocking board being removably supported on the floor on supports arranged near two opposite ends of the rocking board with the supports defining two parallel rotation axes of the rocking board and each one of the rotation axes being near one of said opposite ends of the rocking board and extending transversal to the rocking board,
   a chain on each side of the rocking board each defining two main lifting branches with each main lifting branch being arranged to extend between one part of the frame above the rocking board and couplings mounted on the rocking board, the couplings being arranged near one of said opposite ends of the rocking board, and
   a motor causing the chains to run on command in one or the other direction to alternately place one main lifting branch or the other main lifting branch under tension and to lift the corresponding rocking board end by rotating the rocking board around the rotation axis located near the opposite end of the rocking board.

2. The rocking station in accordance with claim 1, wherein the two main lifting branches of each chain are arranged symmetrically to a median plane extending transversal to the rocking board with the motor being arranged near said transversal plane.

3. The rocking station in accordance with claim 2, wherein the motor is arranged below the rocking board and the two main branches are directed to extend from said motor to two idling pulleys arranged symmetrically to the median plane and supported on the frame above the rocking board to then descend again each towards a second idling pulley forming said couplings arranged near and mounted on one end of the rocking board and rising again towards a third idling pulley supported on the frame above the rocking board and to thence proceed towards an anchorage of said frame with the chain supporting a counterweight between the third idling pulley and said anchorage for keeping the chain under tension.

4. The rocking station in accordance with claim 3, wherein each second idling pulley has a rotation axis virtually coinciding with one of the rotation axes defined by the supports.

5. The rocking station in accordance with claim 3, wherein the counterweight is supported on the chain by a free pulley and fitted with an upper stop striker.

6. The rocking station in accordance with claim 1, wherein the rocking board comprises a powered conveyance system for translation of objects to be rocked between the two opposite ends of the rocking board.

7. The rocking station in accordance with claim 6, wherein the conveyance system is made up of powered rollers with rotation axes extending transversal to the rocking board and designed to support shoes of support and conveyance members for the objects.

* * * * *